(12) United States Patent
Singh

(10) Patent No.: US 9,329,976 B1
(45) Date of Patent: May 3, 2016

(54) APPLICATION DEVELOPMENT VIA A MULTI-UNIT DEVICE

(71) Applicant: Amazon Technologies, Inc., Reno, NV (US)

(72) Inventor: Lokendra Singh, New Delhi (IN)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 57 days.

(21) Appl. No.: 13/925,139

(22) Filed: Jun. 24, 2013

(51) Int. Cl.
*G06F 9/44* (2006.01)
*G06F 11/36* (2006.01)

(52) U.S. Cl.
CPC .................................. *G06F 11/3668* (2013.01)

(58) Field of Classification Search
None
See application file for complete search history.

(56) References Cited

U.S. PATENT DOCUMENTS

| | | | | |
|---|---|---|---|---|
| 7,472,374 B1* | 12/2008 | Dillman | ................... | G06F 8/10 717/102 |
| 7,508,868 B2* | 3/2009 | Chang | ........................... | 375/224 |
| 7,869,824 B2* | 1/2011 | Min | ........................... | 455/550.1 |
| 8,438,256 B2* | 5/2013 | Rogel et al. | ................... | 709/223 |
| 8,793,117 B1* | 7/2014 | Varshney et al. | ............... | 703/21 |
| 9,052,961 B2* | 6/2015 | Mangtani | .............. | G06F 9/5072 |
| 2007/0103110 A1* | 5/2007 | Sagoo | ........................... | 320/109 |
| 2008/0140380 A1* | 6/2008 | Marsyla et al. | ................. | 703/26 |
| 2010/0049895 A1* | 2/2010 | Liang | ........................... | 710/308 |
| 2011/0161484 A1* | 6/2011 | Van den Bogaert et al. | .. | 709/224 |
| 2013/0196765 A1* | 8/2013 | Wolff-Petersen | ....... | G06F 3/023 463/36 |
| 2013/0232497 A1* | 9/2013 | Jalagam | ................ | G06F 9/5072 718/104 |
| 2014/0004852 A1* | 1/2014 | Lehmann et al. | ............. | 455/425 |
| 2014/0380308 A1* | 12/2014 | Hassine | .............. | G06F 9/45558 718/1 |

* cited by examiner

*Primary Examiner* — Wei Zhen
*Assistant Examiner* — Daxin Wu
(74) *Attorney, Agent, or Firm* — Thomas | Horstemeyer, LLP

(57) ABSTRACT

Disclosed are various embodiments for systems and methods to provide access to a plurality of processor units accessible across a network. A system may include multiple stripped down mobile device processor units which may share access to multiple peripheral devices. The processor units may be selected for testing applications, debugging code, and/or any other job that may need processing. The processor units may be monitored and any data generated may be reported to the client.

20 Claims, 4 Drawing Sheets

APPLICATION DEVELOPMENT VIA A MULTI-UNIT DEVICE

BACKGROUND

Developers of applications for processor-based mobile devices such as, for example, smartphones, electronic readers, computing tablets, and similar processor-based electronic consumer devices, frequently seek to validate and otherwise test mobile applications. The applications may be tested on the mobile devices prior to being released to consumers.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure provides systems and methods for providing users access to one or more multi-unit hubs each comprising a plurality of mobile device processor units. According to some embodiments, a multi-unit hub comprises a plurality of stripped down mobile device units. The stripped down mobile devices include mobile device processors and, in some embodiments, associated memory. Each such processor configuration herein is called a processor unit. The mobile device processor units may be manufactured on one or more multi-unit hubs that provide power to all of the processor units, thereby obviating the need to provide a separate power supply for each processor unit as would be done if each processor unit were provided as a standalone device. Furthermore, in some embodiments, each processor unit is accessible by an application developer via a host computing device for application testing, code debugging, etc. In the following discussion, a general description of the system and its components is provided, followed by a discussion of the operation of the same.

Figure 1A:
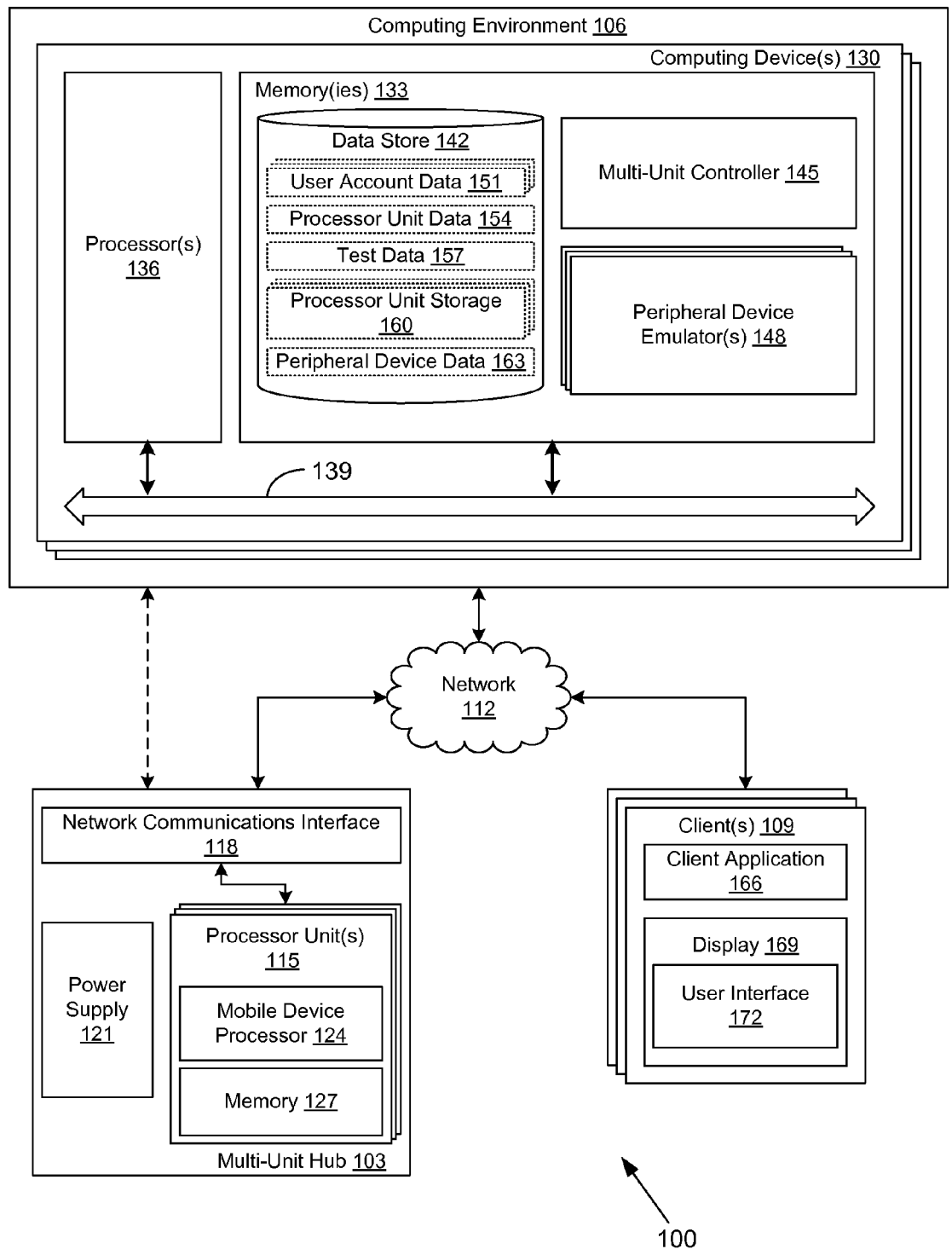
FIGS. 1A-1B are drawings of a networked environment according to various embodiments of the present disclosure.

With reference to FIG. 1A, shown is a networked environment 100 according to various embodiments. The networked environment 100 includes one or more multi-unit hubs 103, a computing environment 106, and one or more client devices 109 in data communication via a network 112. The network 112 includes, for example, the Internet, intranets, extranets, wide area networks (WANs), local area networks (LANs), wired networks, wireless networks, or other suitable networks, etc., or any combination of two or more such networks.

The multi-unit hub 103 may comprise multiple processor units 115, a network communications interface 118, a power supply 121 and potentially other devices as may be appreciated. Each processor unit 115 may comprise a processor circuit of a consumer mobile device such as, for example, a smartphone, computer tablet, electronic reader, etc. The processor unit 115 may include a processor circuit, for example, having a mobile device processor 124 and a memory 127 both of which are coupled to a local interface included on the processor unit 115. Such a local interface may comprise, for example, a data bus with an accompanying address/control bus or other bus structure as can be appreciated.

In some embodiments, the processor unit 115 may not include additional features of a consumer mobile device such as, for example, a casing, a battery, a camera, a display, and/or other features and peripherals that are typically included in a consumer mobile device. However, the processor unit 115 may comprise one or more input/output channels such as, for example, a universal serial bus (USB) port, a display port, a power input, and/or any other input/output channels associated with peripherals as may be appreciated.

Although, as shown in FIG. 1A, each processor unit 115 has an associated memory 127, each processor unit 115 need not have a separate associated physical memory 127 on board, but rather memory may be provided to each processor unit as part of a logical partitioning of a single physical memory, as may be appreciated.

The network communications interface 118 provides a connection between each of the processor units 115 and the computing environment 106. The network communications interface 118 may be a USB hub that contains multiple USB ports. Each processor unit 115 may include a USB port that may be connected to the network communications interface 118. Accordingly, the network communications interface 118 may be used to interact with the computing environment 106 via an appropriate USB connection, either directly or through the network 112. The network communications interface(s) 118 may be integrated into a multi-unit hub 103, or it may be a standalone interface associated with one or more multi-unit hubs 103. In certain embodiments, the network communications interface 118 need not be provided, and each processor unit 115 can be coupled with the network 112 and/or a computing environment 106 without the use of network communications interface 118. In addition, in certain embodiments, the processor unit(s) 115 may couple to the computing environment 106 wirelessly.

The power supply 121 may be used to power the processor units 115. The processor units 115 may be coupled to the power supply 121 via a direct connection, via the network communications interface 118, and/or any other connection that may be appreciated. Alternatively, the power supply 121 may be used to power the network communications interface 118. As such, the processor units 115 may be powered by the network communications interface 118. The computing environment 106 may comprise, for example, a server computer or any other system providing computing capability. Alternatively, the computing environment 106 may employ a plurality of computing devices 130 that may be employed and arranged, for example, in one or more server banks or computer banks or other arrangements. Such computing devices 130 may be located in a single installation or may be distributed among many different geographical locations. For example, the computing environment 106 may include a plurality of computing devices 130 that together may comprise a cloud computing resource, a grid computing resource, and/or any other distributed computing arrangement. In some cases, the computing environment 106 may correspond to an elastic computing resource where the allotted capacity of processing, network, storage, or other computing-related resources may vary over time.

Each computing device 130 includes at least one processor circuit, for example, having a processor 136 and a memory 133, both of which are coupled to a local interface 139. To this end, each computing device 130 may comprise, for example, at least one server computer or like device. The local interface 139 may comprise, for example, a data bus with an accompanying address/control bus or other bus structure as can be appreciated.

Stored in the memory 133 are both data and several components that are executable by the processor 136. In particular, stored in the memory 133 and executable by the processor 136 are the multi-unit controller 145, the peripheral device emulator(s) 148, and potentially other applications. Also stored in the memory 133 may be a data store 142 and other data. In addition, an operating system may be stored in the memory 133 and executable by the processor 136.

Various applications and/or other functionality may be executed in the computing environment 106 according to various embodiments. Also, various data is stored in the data store 142 that is accessible to the computing environment 106. The data store 142 may be representative of a plurality of data stores 142 as can be appreciated. The data stored in the data store 142, for example, is associated with the operation of the various applications and/or functional entities described below.

The components executed on the computing environment 106, for example, include a multi-unit controller 145, one or more peripheral device emulators 148, and other applications, services, processes, systems, engines, or functionality not discussed in detail herein. The multi-unit controller 145 is executed on a processor 136 to provide access to users, for example application developers, to one or more of the processor units 115 configured within a multi-unit hub 103. In addition, the multi-unit controller 145 may be used to determine which processor units 115 are available for executing certain applications, load applications in the memory 127 corresponding to each of the processor units 115, direct processor units 115 to begin executing applications, store results of tests running on the processor units, send peripheral device data to the processor units 115, etc. For example, the multi-unit controller 145 may communicate with each of the processor units 115 via the network communications interface 118 on the multi-unit hub 103 and instruct the processor 136 to provide directives for the processor units 115 to begin accessing instructions for processing, such as, for example, application testing, code debugging, etc.

The peripheral device emulator(s) 148 may be executed by the processor 136 to emulate peripheral device data 163 that may be used by one or more of the processor units 115 executing applications. The peripheral device data 163 produced by the peripheral device emulator(s) 148 may comprise simulated signals, recorded signals collected during real-time experiments, and other suitable signals representing desired peripheral device signals. The peripheral device emulator 148 may emulate representations of one or more peripheral devices. Alternatively, there may be multiple peripheral device emulators 148 that each represents a peripheral device. The type of peripheral devices emulated by the peripheral device emulator 148 may include, but not limited to, a camera, a display, a global positioning system (GPS) sensor, a microphone, an audio input, a gyroscope, a light sensor, a wireless interface and/or any other type of peripheral device.

The data stored in the data store 142 includes, for example, user account data 151, processor unit data 154, test data 157, processor unit storage 160, peripheral device data 163 and potentially other data. The user account data 151 includes various information regarding register users, for example, name, security credentials, device preferences, and/or other data related to registered users accessing the multi-unit hub 103. The processor unit data 154 includes data related to the processor units 115 on the multi-unit hub 103 such as, for example, identifier data, manufacture data, processor specification data, and/or any other information related to each of the processor units 115. The test data 157 may include data that is received by the mobile device processor(s) 124 on the processor units 115 following the execution of an application on one or more of the processor units 115. For example, the test data 157 may include data related to whether the execution of the application yielded any errors that may indicate a hardware, software, or firmware failure.

The processor unit storage 160 may comprise portions of memory that have been partitioned for each of the processor units 115. For example, if the processor units 115 do not include the memory capacity required for executing the one or more applications, the processor units 115 may be able to access a respective portion of the processor unit storage 160 in the memory 133 on the computing environment 106. The peripheral device data 163 includes data associated with one or more peripheral devices. The peripheral device data 163 may comprise simulated signals, recorded signals collected during real-time experiments, and other suitable signals representing desired peripheral device signals.

The client 109 is representative of a plurality of client devices that may be coupled to the network 112. The client 109 may comprise, for example, a processor-based system such as a computer system. Such a computer system may be embodied in the form of a desktop computer, a laptop computer, personal digital assistants, cellular telephones, smartphones, or other devices with like capability. The client 109 may include a display 169. The display 169 may comprise, for example, one or more devices such as liquid crystal display (LCD) displays, gas plasma-based flat panel displays, organic light emitting diode (OLED) displays, LCD projectors, or other types of display devices, etc.

The client 109 may be configured to execute various applications such as a client application 166 and/or other applications. The client application 166 may be executed in a client 109, for example, to access a processor unit 115 on a multi-unit hub 103 via the computing environment 106 and and/or other servers across network 112, thereby rendering a user interface 172 on the display 169. To this end, the client application 166 may comprise, for example, a browser, a dedicated application, etc., and the user interface 172 may comprise a network page, an application screen, etc. The client 109 may be configured to execute applications beyond the client application 166 such as, for example, email applications, social networking applications, word processors, spreadsheets, and/or other applications.

Figure 1B:
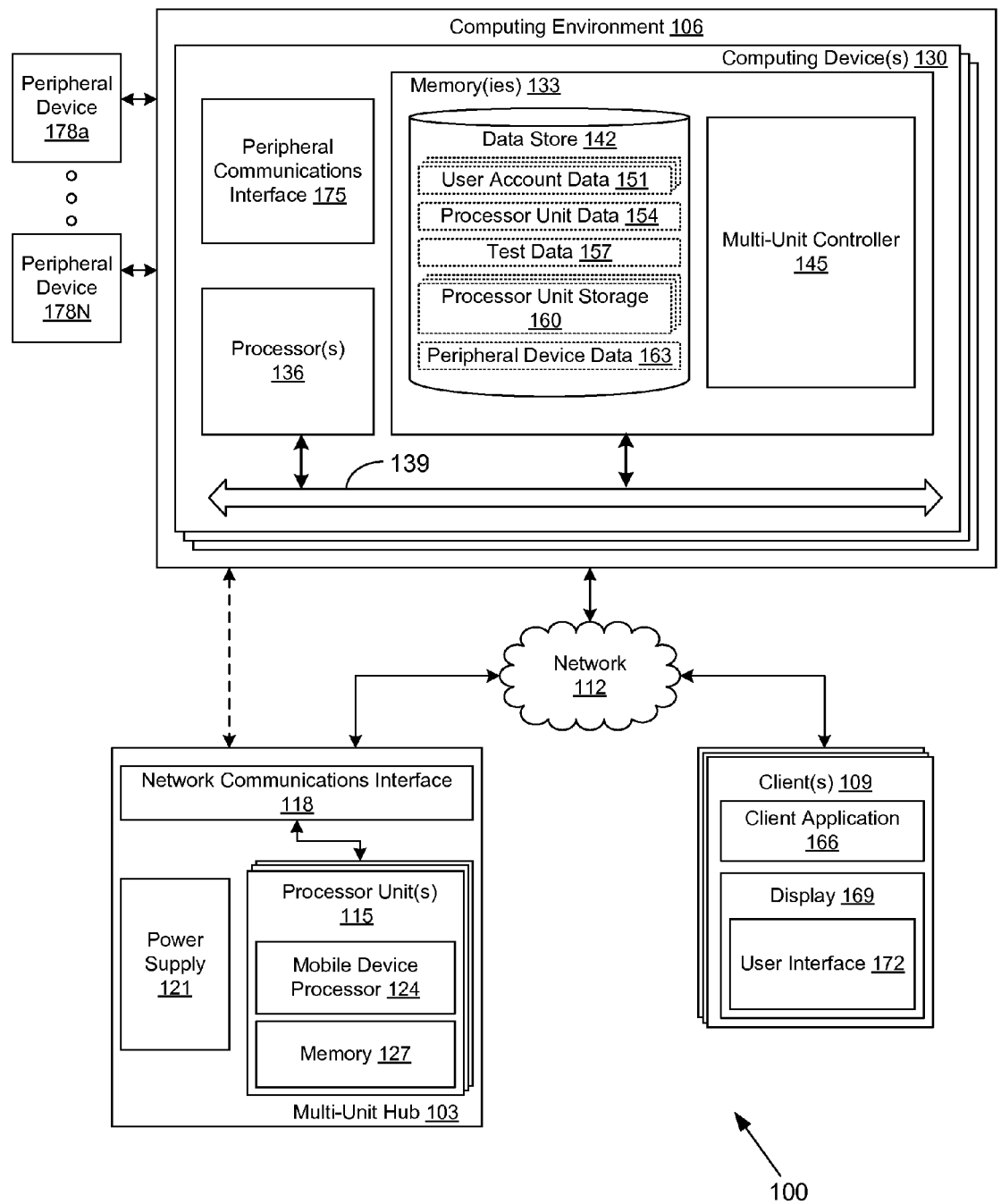

With reference to FIG. 1B shown is network environment 100 according to another embodiment. FIG. 1B differs from FIG. 1A in that the computing environment 106 includes one or more peripheral communications interface(s) 175 for coupling one or more peripheral devices 178a-178N to the computing environment 106. In contrast, FIG. 1A relies on the peripheral device emulator 148 to provide the peripheral device data 163. However, it should be noted that in some embodiments, the computing environment 106 may include both the peripheral device emulator(s) 148 and one or more peripheral devices 178a-178N coupled to the computing environment 106 via one or more peripheral communications interfaces 175. As such, the peripheral device emulator(s) 148 may emulate alternate peripheral devices that are different from the peripheral devices 178a-178N coupled to the one or more peripheral communications interface(s) 175.

The peripheral communications interface(s) 175 may be configured to facilitate data communications between the processor 136 executing the multi-unit controller 145 and the peripheral device(s) 178a-178N. The peripheral communications interface (s) 175 connects the processor 136 with the peripheral device 178a-178N. In some embodiments, each peripheral device may be associated with its own corresponding peripheral communications interface 175. In other embodiments, the peripheral device(s) 178a-178N may share a common peripheral communications interface 175. In other embodiments, some of the peripheral device(s) 178a-178N may share a common peripheral communications interface 175, while others may be associated with its own peripheral communications interface 175 depending on compatibility, etc. The peripheral communications interface 175 may comprise, for example, a data bus with an accompanying address/control bus or other bus structure as can be appreciated.

Also shown in FIG. 1B are peripheral devices 178a-178N. Example peripheral devices 178a-178N may include a camera, a display, a global positioning system (GPS) sensor, a microphone, an audio input, a gyroscope, a light sensor, a wireless interface and/or any other type of peripheral device. The computing environment 106 need not include all available peripheral devices 178a-178N, but may include one or more of any available peripheral devices 178a-178N. Thus, by way of non-limiting example, the computing environment 106 may include a camera and separately an audio input unit, but not a GPS sensor. Other exemplary combinations of peripheral devices 178a-178N are possible, as may be appreciated. Each peripheral device 178a-178N is coupled to and supplies peripheral device data 163 to the processor in the computing environment 106.

In some embodiments, the computing environment 106 may include more than one of the same type of peripheral device 178a-178N. For example, computing environment 106 may include more than one camera. The use of more than one of the same type of peripheral device 178a-178N may be desired to overcome bandwidth or other concerns with respect to being able to distribute data by the processor 136 in the computing environment 106 to all of the processor units 115 on the multi-unit hub 103.

FIGS. 1A-1B as discussed above show various components disposed on a single multi-unit hub 103. In certain embodiments, a plurality of processor units 115 may be grouped logically, independent of whether they are disposed on the same multi-unit hub 103 or on an individually separate multi-unit hub 103. Similarly, the collection of components discussed with respect to FIGS. 1A-1B need not be disposed on a single multi-unit hub 103 such as might be the case when the multi-unit hub 103 comprises a single circuit board, etc., but may be disposed in any convenient physical configuration that provides appropriate interconnections between the components, as may be appreciated.

Although not shown in FIGS. 1A-1B, the computing environment 106 may include a display. The processor units 115 may have shared access to the display. The display may comprise, for example, one or more devices such as liquid crystal display (LCD) displays, gas plasma-based flat panel displays, organic light emitting diode (OLED) displays, LCD projectors, or other types of display devices, etc.

Next, a general description of the operation of the various components of the networked environment 100 is provided. As shown in FIGS. 1A-1B, in some embodiments, the computing environment 106 comprises a multi-unit controller 145. In embodiments, where the networked environment 100 comprises one or more multi-unit hubs 103, the multi-unit controller 145 provides suitable control functionality to manage access to and monitor the operation of one or more multi-unit hubs 103. As discussed above with reference to FIGS. 1A-1B, in some embodiments the multi-unit hub 103 comprises multiple processor units 115 (FIGS. 1A-1B). The multi-unit controller 145 as executed on a processor 136 provides suitable control functionality to manage access to and monitor the operation of a processor unit 115 of the multi-unit hubs 103 to which a user gains access through a client 109. Non-limiting examples of the multi-unit controller 145 functionality include managing access to a particular multi-unit hub 103 and/or a particular processor unit 115 by a particular user in accordance with a user account, monitoring power usage of a processor unit 115 during operation of the testing of an application, and monitoring the processor units 115 for fault signals that may indicate a hardware, software, or firmware failure. Data associated with the operation of a processor unit 115 and/or multi-unit hub 103 can be stored as test data 157 in data store 142.

The multi-unit controller 145 can also operate to control signal flow between a plurality of client 109 and a plurality of different multi-unit hubs 103 and/or processor units 115 to which a plurality of clients 109 seek access. Such control may include, as appropriate, multiplexing and/or distribution of signals to insure that the appropriate connection exists between a client 109 and a respective processor unit 115.

In one non-limiting example, a user at a client 109 may request via the multi-unit controller 145 the execution of an application on a processor unit 115. Such a request may include information about the type of processor unit 115 to which access is requested, a length of time execution may be expected to require, as well as any other information required for the request to be evaluated and granted. The multi-unit controller 145 may evaluate the request and ascertain if a suitable processor unit 115 is available. If a suitable processor unit 115 is available, the multi-unit controller 145 may assign a processor unit 115 and the processor 136 may place the request in a queue for execution. The request is sent to processor unit 115 via the network communications interface 118 on the application on the processor unit 115 when the device is available. The assigned processor unit 115 executes the application and, when needed, receives shared peripheral device data 163 from the processor 136 executing the multi-unit controller 145. During the execution of the application on the processor unit 115, the multi-unit controller 145 may monitor operation of the processor unit 115 and/or the multi-unit hub 103 and the processor 136 may store the test data 157 in the data store 142 via the local interface 139 of the computing device 130. Such monitoring can be at the request of the user of the client 109 or it can be at the request of the operator of the computing environment 106. The test data 157 can be provided to the user of the client 109 as requested.

Figure 2:
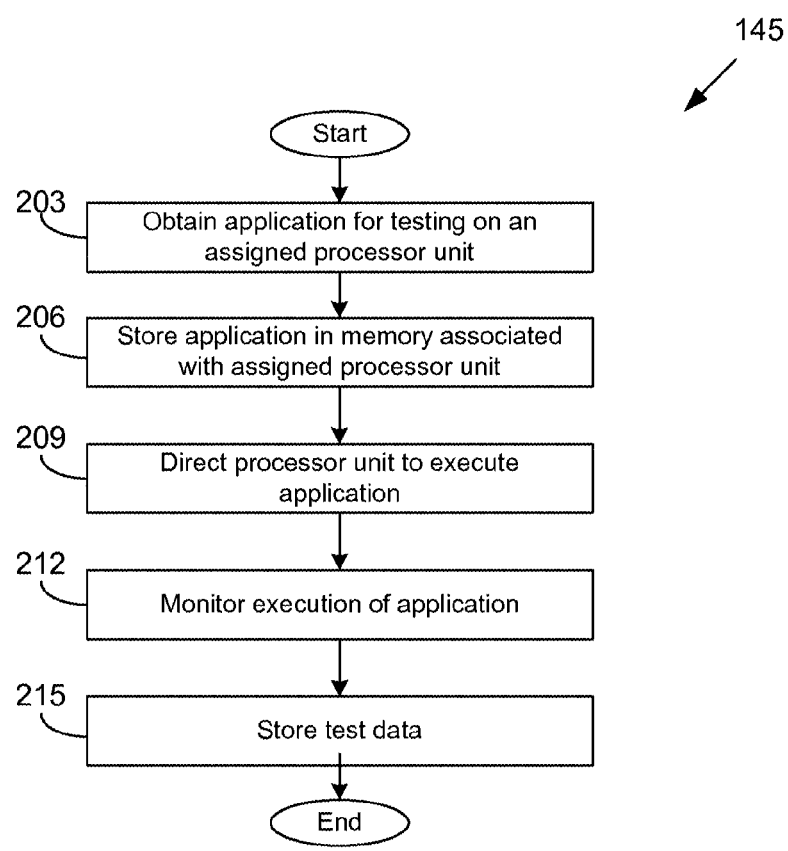
FIG. 2 is a flowchart illustrating one example of functionality implemented as portions of the multi-unit controller of FIGS. 1A-1B according to various embodiments of the present disclosure.

Referring next to FIG. 2, shown is a flowchart illustrating one example of a portion of the operation of the multi-unit controller 145 according to various embodiments. It is understood that the flowchart of FIG. 2 provides merely an example of the many different types of functional arrangements that may be employed to implement the operation of the portion of the network communications interface 118 described herein. As an alternative, the flowchart of FIG. 2 may be viewed as depicting an example of steps of a method implemented in multi-unit controller 145 according to one or more embodiments.

Beginning with box 203, the multi-unit controller 145 obtains a request for a specific processor unit 115 to test an application. As previously discussed, the multi-unit controller 145 may select the appropriate processor unit(s) 106 for testing an application and/or instructions to process another type of job, such as, for example, debugging code, etc. The multi-unit controller 145 sends via the processor 136 executing the multi-unit controller 145 a request to test an application on an assigned processor unit 115. The request may include an identifier associated with a specific processor unit 115, instructions for processing (i.e. an application), and/or other information that may be required to identify and direct a specific processor unit 115.

In box 206, the multi-unit controller 145 stores the application in a memory associated with the assigned processor unit 115. This may be the memory 127 included on the processor unit 115, a portion of the processor unit storage 160 corresponding to the assigned processor unit 115, and/or other partition of memory located on the multi-unit hub 103 or accessible by the multi-unit hub 103.

In box 209, the multi-unit controller 145 via the processor 136 directs the processor unit 115 to execute the application. In directing the processor unit 115, the processor 136 executing the multi-unit controller 145 may send the mobile device processor 124 of the assigned processor unit 115 an address associated with the stored application. The directive will be used by the mobile device processor 124 of the assigned processor unit 115 to begin executing the application for testing.

In box 212, the multi-unit controller 145 monitors the execution of the application. Specifically, multi-unit controller 145 may monitor each of the processor units 115 for any output data associated with operation of the application on the processor unit 115 may be obtained by the processor 136 executing the multi-unit controller 145. The output data may include fault signals that may indicate a hardware, software, or firmware failure. In addition, the output data may include other information pertaining to the processor units 115 such as, for example, the power usage of the assigned processor unit 115 at any given time during the execution of the application.

In box 215, the multi-unit controller 145 stores the test data 157 from the processor unit 115. Upon storing the test data 157 in the data store 142, the operation of the multi-unit controller 145 ends.

Figure 3:
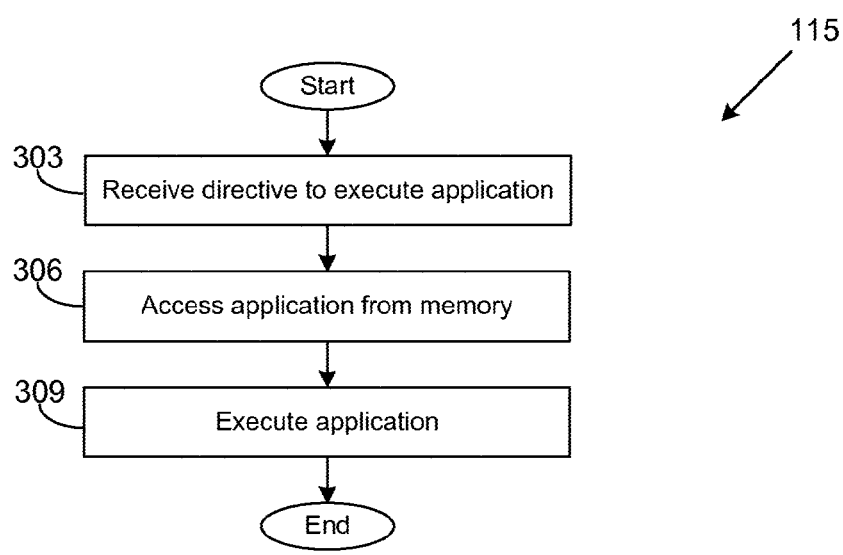
FIG. 3 is a flowchart illustrating one example of functionality implemented as portions of a mobile device processor unit coupled to the multi-unit hub of FIGS. 1A-1B according to various embodiments of the present disclosure.

Referring next to FIG. 3, shown is a flowchart illustrating one example of a portion of the operation of a processor unit 115 (FIGS. 1A-1B) of a multi-unit hub 103 (FIGS. 1A-1B) according to various embodiments. It is understood that the flowchart of FIG. 3 provides merely an example of the many different types of functional arrangements that may be employed to implement the operation of the portion of the processor unit 115 described herein. As an alternative, the flowchart of FIG. 3 may be viewed as depicting an example of steps of a method implemented in multi-unit hub 103 according to one or more embodiments.

In box 303, the mobile device processor 124 on the processor unit 115 may obtain a directive to execute an application from the processor 136 executing the multi-unit controller 145 on the computing environment 106 via the network communications interface 118. The directive may be in the form of an address in the memory 127 on the processor unit 115 or the portion of the processor unit storage 160 located within the computing environment 106. Using the address, the mobile device processor 124 for the assigned processor unit 115 may access instructions related to the execution of an application. In addition, the processor 136 in the computing environment 106 provides via the network communications interface 118 the mobile device processor 124 of the select processor unit 115 with an address to a location in the associated memory for accessing the application and/or instruction.

In box 306, the mobile device processor 124 on the processor unit 115 accesses the application and/or instruction in memory. As previously discussed, the memory may be incorporated in the processor unit 115 as memory 127 as shown in FIGS. 1A-1B, may be a partitioned segment in a memory that is part of the multi-unit hub 103, may be a corresponding portion of the processor unit storage 160 located in the computing environment 106, and/or other memory as may be appreciated. Regardless, the mobile device processor 124 on the processor unit 115 is in data communication with the memory 127 on the processor unit 115 and/or corresponding portion of the processor unit storage 160 and is able to access the application based on the directive obtained from the processor 136 via the network communications interface 118.

In box 309, the processor unit 115 begins executing the application. The processor unit 115 begins accessing instructions with respect to the application stored in the memory 127 of the processor unit 115 and/or corresponding portion of the processor unit storage 160. The processor unit 115 continues to access instructions for executing the application and/or other instructions for processing until completion. In some embodiments, the processor unit 115 may provide output data to processor 136 via the network communications interface 118 which may include fault signals that may indicate a hardware, software, or firmware failure. Additionally, the data associated with the operation of a processor unit 115 and/or multi-unit hub 103 can be stored as test data 157 in data store 142.

In some examples, the application executing on the mobile device processor 124 of the processor unit 115 may require data from a peripheral device 178a-178N, for example, a GPS sensor. The mobile device processor 124 via the input/output port of the processor unit 115 which is related to the GPS sensor may access the data emitted from the GPS sensor via the processor 136 in the computing environment 106. The peripheral device data 163 from the processor 136 may be emulated representations of the peripheral devices 178a-178N as generated by the peripheral device emulator(s) 148 or may be signals received by the processor 136 the peripheral device 178a-178N via the peripheral communications interface 175. When the mobile device processor 124 of the assigned processor unit 115 no longer has instructions for processing, the operations of the processor unit 115 end.

Referring back to FIGS. 1A-1B, it is understood that there may be other applications that are stored in the memory 133 and are executable by the processor 136 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 133 and are executable by the processor 136. In this respect, the term "executable" means a program file that is in a form that can ultimately be run by the processor 136. Examples of executable programs may be, for example, a compiled program that can be translated into machine code in a format that can be loaded into a random access portion of the memory 133 and run by the processor 136, source code that may be expressed in proper format such as object code that is capable of being loaded into a random access portion of the memory 133 and executed by the processor 136, or source code that may be interpreted by another executable program to generate instructions in a random access portion of the memory 133 to be executed by the processor 136, etc. An executable program may be stored in any portion or component of the memory 133 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 133 is defined herein as including both volatile and nonvolatile memory and data storage components. Volatile components are those that do not retain data values upon loss of power. Nonvolatile components are those that retain data upon a loss of power. Thus, the memory 133 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 136 may represent multiple processors 136 and/or multiple processor cores and the memory 133 may represent multiple memories 133 that operate in parallel processing circuits, respectively. In such a case, the local interface 139 may be an appropriate network that facilitates communication between any two of the multiple processors 136, between any processor 136 and any of the memories 133, or between any two of the memories 133, etc. The local interface 139 may comprise additional systems designed to coordinate this communication, including, for example, performing load balancing. The processor 136 may be of electrical or of some other available construction.

Although the multi-unit controller 145, the peripheral device emulator(s) 148, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 2 and 3 are representative of certain processes, functionally and operations of embodiments discussed herein. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 136 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the multi-unit controller 145 and the peripheral device emulator(s) 148, that comprises software or code can be embodied in any non-transitory computer-readable medium for use by or in connection with an instruction execution system such as, for example, a processor 136 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:
1. A system, comprising:
at least one processor;
at least one memory coupled to the at least one processor;
a multi-unit controller executable by the at least one processor; and
a multi-unit device in data communication with the at least one processor, the multi-unit device comprising a plurality of mobile device processor units disposed on a board, and individual mobile device processor units of the plurality of mobile device processor units being associated with a respective portion of the at least one memory, wherein the multi-unit controller causes the at least one processor to at least:

select a particular mobile device processor unit of the plurality of mobile device processor units to test a mobile application received from a client device;

direct the particular mobile device processor unit to execute the mobile application; and transmit peripheral device data to the particular mobile device processor unit testing the mobile application, the peripheral device data being generated via the at least one processor by emulating one or more peripheral devices that are absent from the particular mobile device processor unit.

2. The system of claim 1, wherein the one or more peripheral devices comprise at least one of the following: a camera, a display, a global positioning system (GPS) sensor, a wireless interface, a microphone, an audio input, a gyroscope, or a light sensor.

3. The system of claim 1, further comprising one or more actual peripheral devices being in data communication with the at least one processor, and wherein the multi-unit controller further causes the at least one processor to at least send additional peripheral device data generated by the one or more actual peripheral devices to the plurality of mobile device processor units.

4. The system of claim 1, further comprising a universal serial bus (USB) hub, wherein at least one of the plurality of mobile device processor units comprises a USB port, and the at least one of the plurality of mobile device processor units is coupled to the USB hub via the USB port.

5. The system of claim 4, wherein the at least one processor is in data communication with the at least one of the plurality of mobile device processor units via the USB hub.

6. A system, comprising:

at least one processor;

at least one memory coupled to the at least one processor;

a multi-unit device comprising a plurality of mobile device processor units, the multi-unit device being in data communication over a network with the at least one processor, individual mobile device processor units of the plurality of mobile device processor units being configured to test one or more mobile applications;

a plurality of peripheral devices being in data communication with the at least one processor, the plurality of peripheral devices being accessible to the plurality of mobile device processor units over the network via the at least one processor, wherein the plurality of peripheral devices are absent from at least one of the plurality of mobile device processor units; and at least one application executable by the at least one processor, wherein the at least one application causes the at least one processor to at least:

receive peripheral device data generated by at least one of the plurality of peripheral devices; and send the peripheral device data over the network to the plurality of mobile device processor units, the peripheral device data being used by the one or more mobile applications being tested on the plurality of mobile device processor units.

7. The system of claim 6, wherein the individual mobile device processor units of the plurality of mobile device processor units are associated with a respective portion of the at least one memory.

8. The system of claim 6, further comprising a network communications interface being in data communication with the plurality of mobile device processor units.

9. The system of claim 8, wherein the network communications interface is a universal serial bus (USB) hub and at least one of the plurality of mobile device processor units comprise a USB port, the USB hub being coupled to the at least one of the plurality of mobile device processor units and the at least one processor being in data communication with the at least one of the plurality of mobile device processor units via the USB hub.

10. The system of claim 6, wherein the at least one application further causes the at least one processor to at least provide a directive to a particular mobile device processor unit of the plurality of mobile device processor units to begin execution of the one or more mobile applications.

11. The system of claim 6, wherein the plurality of peripheral devices include at least one of the following: a camera, a display, a global positioning system (GPS) sensor, a microphone, an audio input, a gyroscope, a wireless interface, or a light sensor.

12. The system of claim 6, wherein the at least one application further causes the at least one processor to at least emulate one or more alternate peripheral devices to generate emulated peripheral device data used by the one or more mobile applications.

13. The system of claim 6, wherein the multi-unit device further comprises a power supply, the plurality of mobile device processor units being powered by the power supply which is shared by the plurality of mobile device processor units.

14. A method, comprising:

receiving, by at least one processor, a mobile application from a computing device;

selecting, by the at least one processor, at least one mobile device processor unit of a multi-unit device comprising a plurality of mobile device processor units to test the mobile application;

sending, by the at least one processor, the mobile application and an instruction to execute the mobile application over a network to the at least one mobile device processor unit;

receiving, by the at least one processor, peripheral device data from at least one of one or more peripheral devices or a peripheral device emulator; and sending, by the at least one processor, the peripheral device data over the network to the at least one mobile device processor unit, the peripheral device data being used by the mobile application executed on the at least one mobile device processor unit, and the one or more peripheral devices being absent from at least one of the plurality of mobile device processor units.

15. The method of claim 14, wherein the one or more peripheral devices are at least one of the following: a camera, a display, a global positioning system (GPS) sensor, a microphone, an audio input, a gyroscope, a wireless interface, or a light sensor.

16. The method of claim 14, wherein the one or more peripheral devices are in data communication with the at least one processor via a peripheral communication interface.

17. The method of claim 14, wherein the plurality of mobile device processor units share a power supply, and further comprising distributing power from the power supply to the plurality of mobile device processor units.

18. The method of claim 14, further comprising monitoring,
by the at least one processor, one or more operations of the at least one mobile device processor unit executing the mobile application.

19. The method of claim 14, wherein the plurality of mobile device processor units are in data communication with the at least one processor via a universal serial bus (USB) hub.

20. The system of claim 1, wherein the multi-unit device further comprises a power supply, the plurality of mobile device processor units being powered by the power supply which is shared by the plurality of mobile device processor units.

* * * * *